United States Patent Office 3,287,715
Patented Nov. 22, 1966

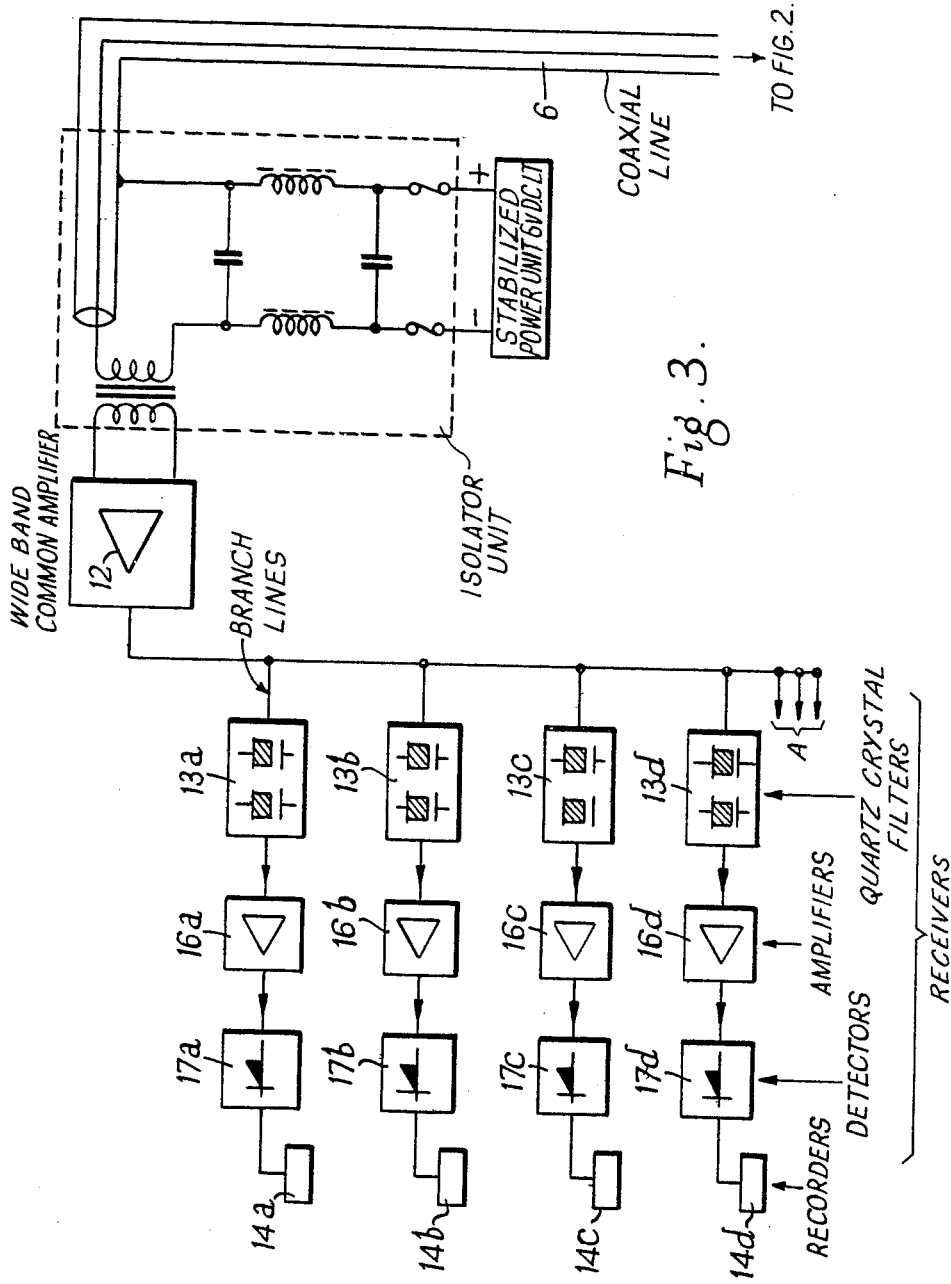

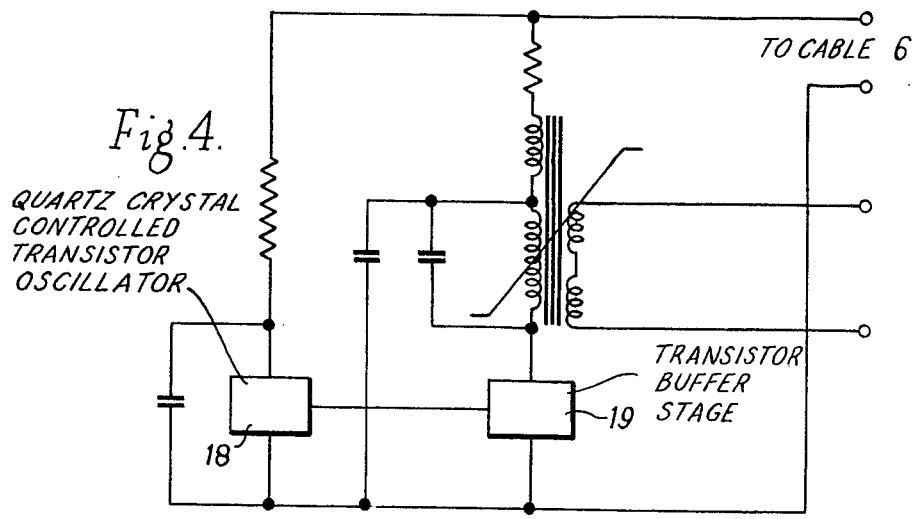
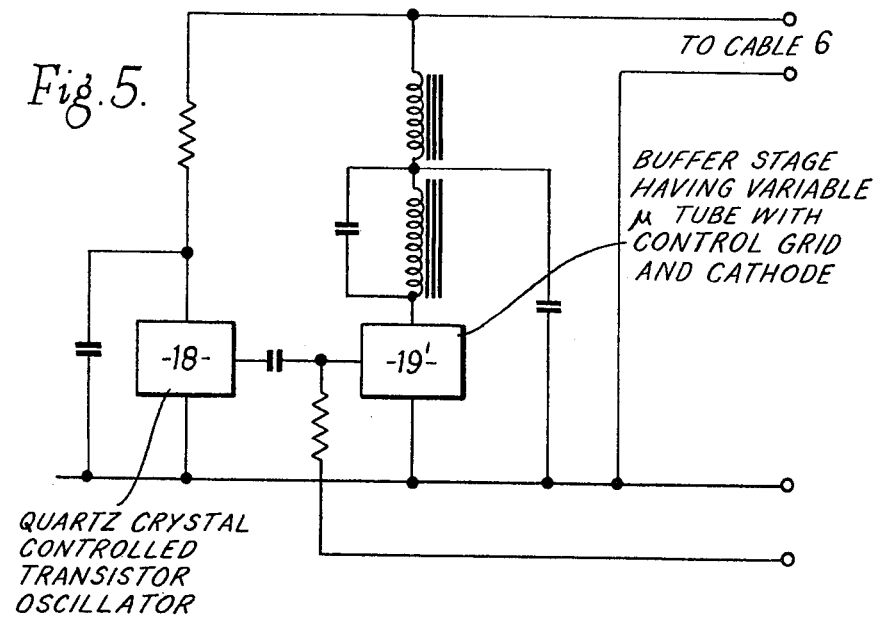

3,287,715
ELECTRONIC INDICATOR SYSTEMS
Frederick Charles Riches, Hounslow, Peter Harry Varney, Windsor, and Kenneth Clark, Cheltenham, England, assignors to Sargrove Electronics Limited, Hounslow, Middlesex, England, a British company
Filed June 17, 1965, Ser. No. 464,729
Claims priority, application Great Britain, June 17, 1960, 21,342/60, Patent 914,998
1 Claim. (Cl. 340—184)

This application is a continuation-in-part of Serial No. 55,367, filed September 12, 1960, now abandoned.

This invention relates to the provision of a system for continuously measuring or sampling a physical condition at a number of remote sites and for giving at a central or near station a continuous indication of the physical condition prevailing at the remote sites.

The underlying idea of the invention is to produce at each of the remote sites an electrical signal proportional to the prevailing physical condition to be measured then to transmit such signals from the remote sites to the central or near station and then to produce at the central or near station a continuous indication or record of the conditions prevailing at each of the remote sites.

Physical conditions to be measured include electrical current, watts, pressure, temperature, humidity, gas concentration, and so on. Physical conditions such as these may require to be measured and indicated in many different circumstances. For example, on board ship it may be desired that a continuous indication of the temperature at various parts of the ship, i.e. the remote sites, be given in a boiler control room, i.e. the central station. In another example, at a mine it may be desired that a continuous indication of the dust level in each of a number of workings i.e. the remote sites, be given at a control room above ground, i.e. the central station.

According to the present invention, we provide a system for continuously indicating the prevailing conditions at a number of remote stations comprising transducer means operative in dependence on a local physical condition to generate a continuous low voltage output proportional to the physical condition of each of the remote stations, remote low voltage radio frequency quartz controlled transistor oscillation generator means at each remote station supplying an output signal at a unique stable frequency, means coupling the transducer output, to the generator means for varying the amplitude of the respective unique radio frequency output signals, a coaxial line connected to all the generators to feed their respective unique radio frequency output signals through a common transmission channel, a wide band amplifier connected to the coaxial line operative to amplify all the signals from the remote stations, branch lines for each of the said generators fed by the wide band amplifiers, each branch including a quartz crystal controlled filter selectively tuned to the unique radio frequency signal of one of the generators, means for providing a stabilised D.C. voltage on the coaxial line, a demodulator circuit to provide a D.C. voltage output which is proportional to the varying amplitude of the unique frequency signal comprising a detector connected to the quartz crystal controlled filter to receive its output signal and a continuous indicator connected to the detector output to indicate the level of the remote station condition.

The use of a coaxial line permits a large number of discreet continuous state signals to be transmitted simultaneously over the same cable. The frequency separation of these signals is preferably 500 cycles and although the fundamental frequencies employed are not limited to the particular range mentioned herein, the preferred frequency band is 60 kc/s. to 140 kc/s.

The invention and various modifications thereof will now be particularly described by way of example with reference to the accompanying drawings in which:

FIGURE 3 is a block circuit diagram of the receiving end in more detail, and

FIGURES 4 and 5 show circuit diagrams of two alternative forms for modulating the amplitude of the carrier frequency end in rather more detail.

Figure 1:
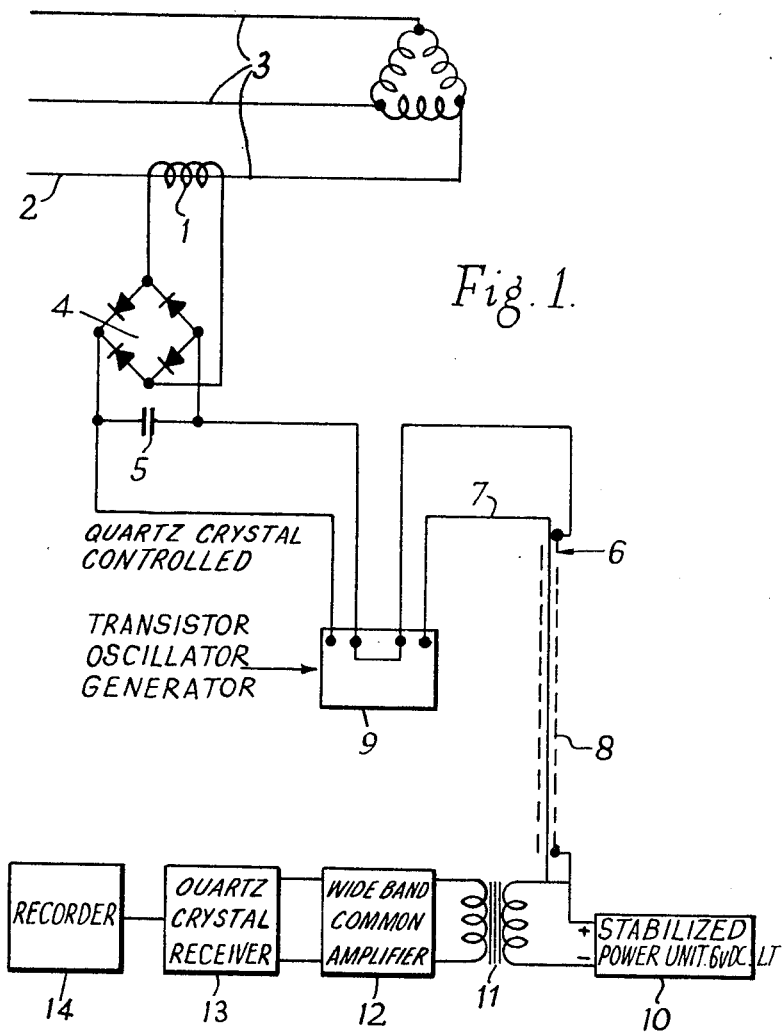
FIGURE 1 is a block diagram giving the general outline of a system in accordance with the invention.

Referring to FIGURE 1 of the drawings, a current transformer 1 is installed around one leg 2 of a three phase electrical system 3. The current or voltage from the secondary of the transformer 1 is rectified by a suitable rectifier circuit 4 incorporating a smoothing capacitor 5 and the D.C. output is fed into a coaxial line 6 via a transistor oscillation generator 9 set to produce a unique stable frequency. The coaxial line 6 having an inner conductor 7 and a sheath 8 is in series with the normal supply voltage feeding the circuit of a transistor oscillator generator 9 so that the D.C. output from the current transformer 1 and associated rectifier circuit 4 is either additive to or opposite in sign to a stabilised low voltage D.C. source 10 supplying the transistor oscillator circuit. Thus the low voltage D.C. output from the current transformer 1 is either adding to or subtracting from the stabilised low voltage source 10 supplying the normal power to the oscillator 9. This varies the amplitude of the signal from the oscillator 9, the amplitude of its output following the current flowing in the primary circuit or phase leg 1 of the electrical supply 3.

At the near or central station which forms the receiving end of the system, this R.F. signal of varying amplitude will be transmitted via an isolating transformer 11 and a common amplifier 1S to a twin quartz crystal filter unit 13 tuned to the appropriate frequency, the output of which will vary according to the amplitude of the received signal thus to operate a suitable recording means 14.

To achieve an adequate rejection ratio of signals of varying amplitude with a relatively small separation of fundamental frequencies of around 500 cycles, the gating circuit has a pass band not exceeding 40 cycles which can be obtained either by the known techniques of suitable filters or by a twin quartz crystals, these crystals having their frequencies suitably displaced to achieve this narrow band pass condition.

One of the major problems confronting engineers concerned with transmitting signals in circumstances where stringent fire precautions are necessary is the provision of an adequate and reliable low voltage supply. Hitherto, intrinsically safe Le Clanchy type batteries have been used. Such batteries are in the present system replaced by a low tension stabilised D.C. source.

As previously mentioned, the 0–2 volts (variable) from the transducer source is either added to, or subtracted from the D.C. coaxial line voltage to increase or decrease the amplitude of the unique oscillation frequency. According to a feature of this invention which enables a telemetering system employing a varying amplitude oscillation system to be feasible, the voltage on the coaxial line is stabilised. In these circumstances dry cell batteries are unsuitable owing to their constant decay in voltage which would give rise to continuous errors throughout their life.

If the case of the stabilised low voltage D.C. supply unit a semiconductor circuit limiting circuit is employed so that in the event of a short circuit of the main coaxial cable, the short circuit current is limited to the requirements of the standards laid down in the intrinsically safe apparatus regulations. Further, the low tension stabilised unit is fitted with another safety device which takes the form of an audible and visual alarm indicator, in the event of any other A.C. voltage being accidentally applied to the coaxial cable at any point along its length. In this case should any voltage in excess of 15 v. A.C. be applied to the conductor(s) of the coaxial cable, the unit automatically trips and isolates the cable.

It will be seen by this example of the continuous state measurement of a current flowing in an electrical circuit that, if suitable transducers are provided to modulate the signal output of the oscillator circuit, that other physical phenomena can be continuously monitored or measured. It is understood that in a mine or similar installation where intrinsic safety is required of the oscillator circuits underground that it is preferable to supply the low D.C. voltage required to power the oscillator circuit down the coaxial cable but in other installations this could be supplied by batteries sited locally or by a stabilised D.C. supply source incorporated within the unit containing the transmitter oscillator. As mentioned above, the ancillary low voltage D.C. output from the transducer means connected in series with the supply either additive in sign or in opposition, will control the amplitude of the R.F. signal output of the transistor oscillator.

Conversely, if the system is reversed, it can be employed to control operational means, e.g. a positional servo system being one of the many examples.

Figure 2:
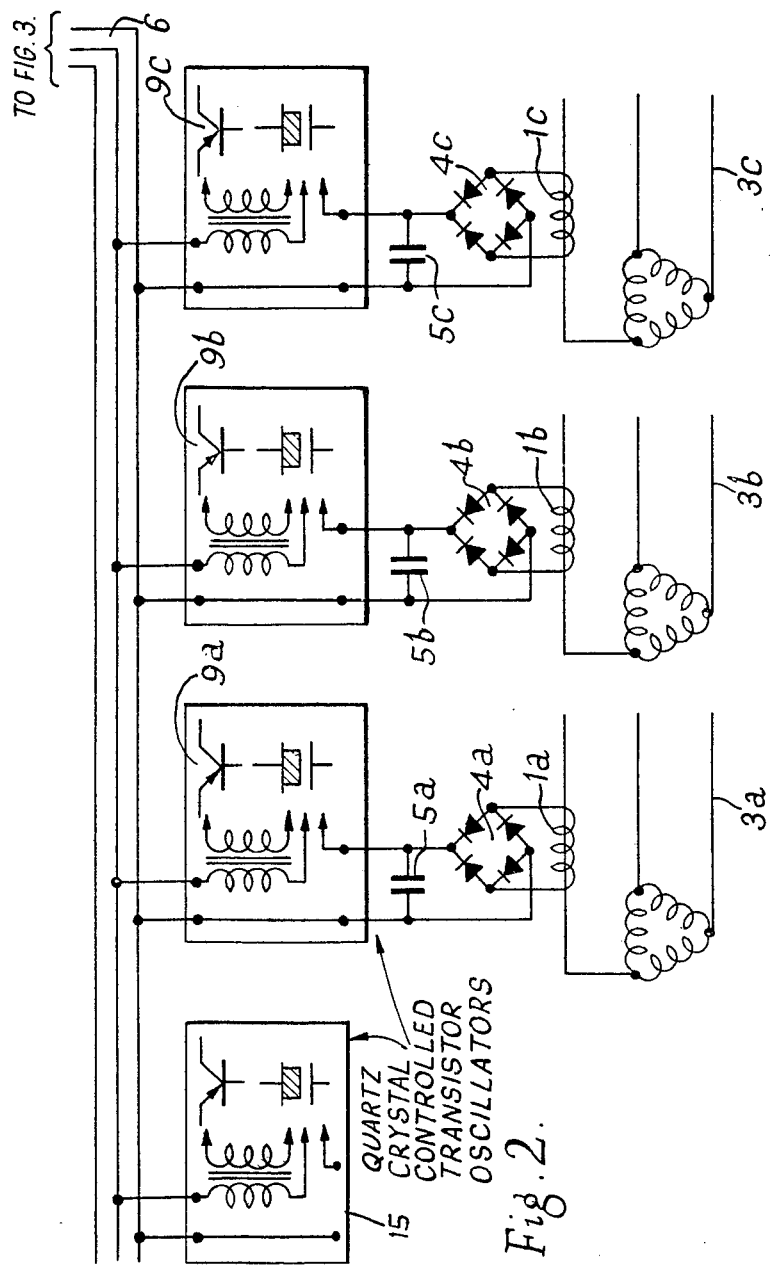
FIGURE 2 is a circuit diagram of the transmitting end in more detail.

In FIGURES 2 and 3 the same references are used as in FIGURE 1. In FIGURE 2, three phase supply lines are indicated at 3a, 3b, 3c, current transformers are indicated at 1a, 1b, 1c, and rectifiers 4a, 4b, 4c. Smoothing capacitors are at 5a, 5b, 5c, and transformer crystal oscillator units at 9a, 9b, 9c, channels being 60–140 kc./s. with 500 kc./s. separation. A system check oscillator at the end of the spur is indicated at 15.

The output from each unit 9a, 9b, 9c, is fed to the coaxial line 6 which takes the signals to the common amplifier 12. The output of the wide band pass common amplifier 12, is taken to a plurality of double crystal filter units 13a, 13b, 13c, 13d, and to others simply indicated by the arrows A. The output of each filter is taken to an amplifier 16a, 16b, 16c, 16d and to a detector 17a, 17b, 17c, 17d, and then to recorders 14a, 14b, 14c, 14d.

It is understood that the method of oscillator amplitude control described above is not the only means of varying the amplitude of an R.F. signal from a transistor type oscillator, neither is the system restricted to transistorised oscillators. Thus, for example, the low voltage D.C. output from any transducer employed can control the output of a buffer output stage of a transistor oscillator by means of a control circuit consisting of a transformer having a tertiary winding. In such a case the transformer has a primary winding matched to the buffer stage output with a suitable ratio to a secondary winding matched to the impedance of the coaxial line, the tertiary winding being connected to the low voltage D.C. output from the transducer so as to control the output of the transformer from zero to maximum output signal voltage.

As another alternative, in the case of a system employed in situations other than mines, thermionic tubes can be employed for the oscillator and the low voltage D.C. output from the transducer made to control by known techniques such as grid control, thermionic tubes having variable characteristics and other known means, the amplitude of the R.F. output.

FIGURE 4 is a circuit diagram of an alternative means for modulating the amplitude of the carrier employing a transistor buffer stage 19 in which there is included a transformer having a tertiary winding designed to limit or vary its A.C. signal output by varying the core saturation. Thus the transfer value of the primary to secondary by means of a 0–2 volt D.C. output from the transformer source is dependent on the electrical characteristics of the transformer core.

FIGURE 5 is a circuit diagram of a further alternative in which a buffer stage 19' having a thermionic valve with variable $\mu$ characteristics is employed. The 0–2 volts D.C. (approximate) from the transducer source when applied as a bias to the control grid or the cathode of the valve, varies the amplification factor and will, therefore, vary the amplitude of the carrier from an oscillator 18 into the coaxial line.

A system as described above may be modified to include a discrete level indicator whereby at levels between approximately 30% and maximum signal amplitude, a relay or other device may be triggered to give a discrete event indication within the continuous signal level recording. Such an indication may give an audible or visual warning. The events may also be recorded to give a continuous record of the discrete information.

What we claim is:

A system for continuously indicating prevailing conditions at a number of remote stations comprising first means operative in dependence on a local physical condition to generate a continuous low voltage output proportional to the physical condition at each of the remote stations, remote low voltage radio frequency quartz controlled transistor oscillation generator means at each remote station supplying an output signal at a unique stable frequency and comprising a variable $\mu$ thermionic tube having a cathode and a control grid, means supplying an input signal at said unique stable frequency to the tube, and means coupling the first means to the tube to supply varying grid-cathode bias potential to vary the amplification factor of the tube, a coaxial line to feed the respective unique radio frequency output signals through a common transmission channel, means coupling the generator means tube to the cable to supply the output signal thereto at said unique frequency at an amplitude controlled by the first means, a wide band amplifier connected to the coaxial line operative to amplify all the signals from the remote stations, branch lines for each of the said generators fed by the wide band amplifier, each branch including a quartz crystal filter selectively turned to the unique radio frequency signal of one of the generators, means for providing a stabilised D.C. voltage on the coaxial line, a demodulator circuit to provide a D.C. voltage output which is proportional to the varying amplitude of the unique frequency signal comprising a detector connected to the quartz crystal filter to receive its output signal, and a continuous indicator connected to the detector output to indicate the level of the remote station condition.

References Cited by the Examiner

UNITED STATES PATENTS

| | | | |
|---|---|---|---|
| 2,724,821 | 11/1955 | Schweitzer | 345—210 |
| 2,942,112 | 6/1960 | Hearn | 340—182 |
| 3,122,707 | 2/1964 | Godbey | 340—184 |

NEIL C. READ, *Primary Examiner.*

T. B. HABECKER, *Assistant Examiner.*